United States Patent
Ohtani

[11] Patent Number: 5,846,421
[45] Date of Patent: Dec. 8, 1998

[54] CARTRIDGE MEMBRANE FILTER FOR MICRO-FILTRATION

[75] Inventor: Sumio Ohtani, Kanagawa, Japan

[73] Assignee: Fuji Photo Film Co., Ltd., Kanagawa, Japan

[21] Appl. No.: 798,055

[22] Filed: Feb. 11, 1997

[30] Foreign Application Priority Data

Feb. 13, 1996 [JP] Japan .................................... 8-025477

[51] Int. Cl.$^6$ .................................................. B01D 27/06
[52] U.S. Cl. ................................ 210/493.2; 210/500.27; 210/500.41; 210/506; 427/244; 427/245; 264/425; 264/446
[58] Field of Search ............................. 96/4, 10, 11, 12; 210/321.77, 321.86, 493.1, 493.2, 493.5, 500.1, 500.21, 500.27, 500.41, 506, 508; 427/244, 245; 264/425, 446

[56] References Cited

U.S. PATENT DOCUMENTS

| | | | |
|---|---|---|---|
| 4,579,698 | 4/1986 | Meyering et al. | 264/41 |
| 4,906,371 | 3/1990 | Miller | 210/321.61 |
| 4,929,354 | 5/1990 | Meyering et al. | 210/321.61 |
| 4,956,089 | 9/1990 | Hurst | 210/484 |
| 4,959,150 | 9/1990 | Degen | 210/490 |
| 5,277,812 | 1/1994 | Hu et al. | 210/500.41 |
| 5,709,798 | 1/1998 | Adiletta | 210/506 |

*Primary Examiner*—W. L. Walker
*Attorney, Agent, or Firm*—Sughrue, Mion, Zinn, Macpeak & Seas, PLLC

[57] ABSTRACT

The microfiltration membrane cartridge filter is formed by pleating a porous membrane sheet having a mean pore size of 0.05 to 10 $\mu$m, rounding the sheet in the form of a cylinder, liquid-tightly sealing joints of the rounded sheet and liquid-tightly sealing opposite ends of the cylinder by end plates, wherein pores in the opposite end portions of the cylindrical pleated membrane are filled up with a high molecular-weight polymer to reject the liquid-permeation of the opposite end portions of the cylindrical pleated membrane. The microfiltration membrane cartridge filter can be made wet to water easily so that an integrity test for the filter is carried on easily.

8 Claims, 1 Drawing Sheet

CARTRIDGE MEMBRANE FILTER FOR MICRO-FILTRATION

BACKGROUND OF THE INVENTION

The present invention relates to a cartridge membrane filter for microfiltration of liquid, and particularly to a pleat-type cartridge membrane filter with high reliability.

At microfiltration by using polymer membranes, in order to increase filtration efficiency and to facilitate its handling, various-type membrane modules and elements have been produced and put on the market. A typical one is a cartridge type filter with pleated membrane with large membrane surface and high treatment capacity for filtration. In this case, when a membrane having a small bending strength is used, membrane is broken often at process of pleat-type cartridge modules. To overcome such a disadvantage, nonwoven fabrics or nets formed from a polymer are provided on the cartridge filter so as to support the membrane from both sides (for example, Unexamined Japanese Patent Publication No. Sho-60-58208) and the pleat membrane is sandwiched with the nonwoven fabrics or nets which play the role as spacers for the double purposes of supporting the membrane and preventing the membrane surfaces from contacting each other.

A method in which polyvinyl alcohol is applied only onto the seal portion of the pleated cartridge filter film is disclosed in Unexamined Japanese Patent Publication No. Hei-6-277466. In this method, however, polyvinyl alcohol is gradually dissolved out from the filter filtration process so that not only the filtrate is contaminated but also the amount of polyvinyl alcohol in the seal portion of cartridge filter is reduced into such a state as if polyvinyl alcohol was not used from the first.

Several methods for filling up membrane micropore only in the seal region between the membrane and the end plate have been proposed in Japanese Patent Unexamined Publication No. Sho-59-501251. In a method in which pores in membrane end portions are pressed by a roller or eliminated by a heat sealer, the membrane thickness of the pressed portion is reduced to be not larger than ⅓ of the original membrane thickness so that the durability of the membrane goes down remarkably. Thus, this method cannot be applied in practical used. Although a method of laminating for a reinforcement the thinner portions in membrane brought out by elimination of pores has been proposed, the lamination must be done not only upon the thinner portions of the membrane but also upon the thicker portions of the membrane having pores remaining partially, for the purpose of safety. Therefore, even if the membrane is to be wound up after continuous lamination, the longer membrane cannot be wound up because of lack of uniformity in membrane thickness. On the other hand, it is very difficult to pleat process the membrane in laminated reinforcing membrane. Unexamined Japanese Patent Publication No. Sho-59-501251 has proposed a method of forming membrane derived from an integrated sheet which is non-porous only at its opposite ends but microporous in its center portion. In this method, however, there is a wide difference in the shrinkage factor and force of the membrane in the membrane formation process between the non-porous portion and the microporous portion, so that it is very difficult to form a flat membrane for practical use.

Further, in such a type cartridge filter for microfiltration, an "integrity test" for insurance the reliability of filtration is conducted to check whether or not there is any defect such as pinhole, breaking, etc. in the filter. In any method, the integrity of the cartridge filter is checked by measuring the amount of diffused gas or the pressure of starting gas transmission while filling up micropores in membrane with a liquid and applying gas pressure to the filter. Accordingly, if a portion not filled with the liquid is present partially in the membrane pores, a large amount of gas is transmitted from the portion at a lower pressure so that accurate measurement is not possible. In the cartridge filter, because a large part of membranes are folded or laminated in a predetermined space, bubbles interfere with wetting the membrane, so that a non-wetted portion with liquid may appear in the membrane. Since water is frequently used as such a liquid, bubbles in the water cannot be easily eliminated because of large surface tension. Therefore, JIS K 3832 "Bubble Point Test Method for Microfiltration Membrane Elements and Modules" provides a method in which filtration is applied under differential pressure of about 30 to 100 kPa, while discharging air in the primary side of a housing to thereby make the filter wet by filtrating liquid. Even if the liquid is filtrated under such conditions, however, the membrane cannot be always made wet perfectly. The place difficult to make the filter wet to the liquid is a place where the membrane is liquid-tightly sealed by another member. Note that the term, "liquid-tightly seal" in the present specification means a complete seal in which any gap through which liquid can be leaked is generated even if pressure is applied thereto. In the pleated type cartridge filter, a pleat membrane is rounded in the form of a cylinder and joints of the rounded membrane are sealed and, further, opposite ends of the cylinder are sealed to plates called "end plates" respectively. It is difficult to make a perfectly wet membrane in the neighborhood of the seal portion. Accordingly, because of large fluctuations, the diffusion flow rate becomes larger than its original value or the bubble point value becomes smaller than its original value. Accordingly, wetting failure cannot be discriminated from defects such as pinhole, breaking, etc. of the filter, so that there is such a tendency that a good product is regarded as a poor product, or vise versa by mistake. Particularly in the case of a cartridge filter -using a microporous structure membrane having a minimum pore size layer in its inside, it is difficult to make the seal portion wet between the film and the end plate.

On the other hand, a large amount of water must be passed through under differential pressure of 30 to 100 kPa from the primary side to the secondary side of the filter. Accordingly, there arises a further problem that a large-capacity pump must be used or filtration cost is increased with usage of a large amount of expensive distilled pure water in pharmaceutical industries.

SUMMARY OF THE INVENTION

An object of the present invention is to provide a microfiltration membrane cartridge filter which can be made wet to water easily so that the integrity test can be carried upon easily and accurately.

Another object of the present invention is to provide a highly reliable microfiltration membrane cartridge filter in which the integrity on test can be conducted without spoiling the filtration, the capacity, the supplementary characteristic and the durability of the cartridge filter.

The foregoing objects could be achieved by filling membrane pores with high molecular-weight polymers in advance only in the vicinity of the seal portion of the pleated type cartridge filter.

That is, the gist of the present invention is in a microfiltration membrane cartridge filter formed by pleating microporous membrane sheet having a mean pore size in a range of from 0.5 to 10 μm, rounding the sheet in the form of a cylinder, liquid-tightly sealing joints of the rounded sheet and liquid-tightly sealing opposite ends of the cylinder by end plates, wherein pores in the opposite end portions of the cylindrical pleated membrane are filled with high molecular-weight polymers to stop the liquid permeation of the opposite end portions of the cylindrical pleated membrane.

DESCRIPTION OF THE PREFERRED EMBODIMENTS

The configuration of a microfiltration membrane cartridge filter according to the present invention will be described below in detail together with the method of producing the same.

Figure 1:
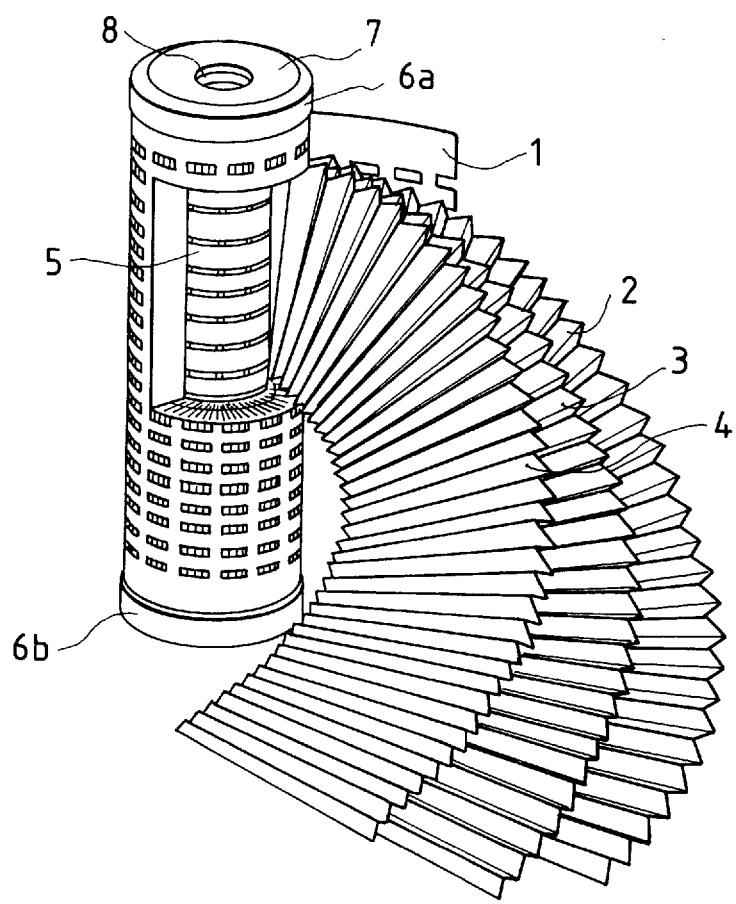
FIG. 1 is a partly development view showing the structure of a general pleated type cartridge filter.
Figure 2:
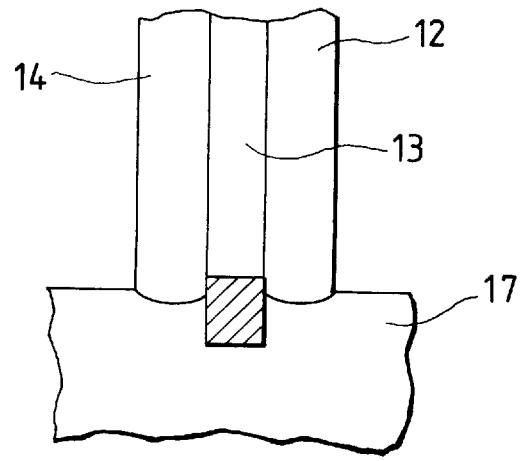
FIG. 2 is a schematic view of the structure of the neighborhood of the end seal portion in an embodiment of the present invention.

FIG. 1 is a development view showing the overall structure of a general pleat-type microfiltration membrane cartridge filter. A microfiltration membrane 3 pleated while interposed between two liquid-permeable sheets 2 and 4 is wound on a core 5 having a large number of liquid collection ports. An outer circumferential guard 1 is provided in the outside of microfiltration membrane 3 to protect the microfiltration membrane 3. The precision filtration film 3 is sealed by end plates 6a and 6b at opposite ends of the cylinder. The end plates 6a and 6b abut on a seal portion of a filter housing (not shown) through a gasket 7. Filtrated liquid is collected from the liquid collection ports of the core 5 and comes out from an outlet 8. FIG. 2 is a view typically showing a state in which the membrane is sealed by each end plate. In FIG. 2, the reference numerals 12 and 14 designate cross sections of the liquid-permeable sheets; 13, a cross section of the microfiltration membrane; and 17, a cross section of the end plate. The hatching portion of the microfiltration membrane shows an end portion in which a micropore is filled with high molecular-weight polymers. Incidentally, end portions of the liquid-permeable sheets 12 and 14 may be filled with a high molecular-weight polymer by a method of filling the end portions with high molecular-weight polymer as will be described later.

There is no limit in the membrane material, pore structure, etc. of the microfiltration membrane which is usable in the present invention. Although the methods of producing such microfiltration membranes are roughly classified into a solution method and a hot melt method, a general method using the solution method is described here. In the solution method, known high molecular-weight polymers such as vinyl polymers such as polyvinylidene fluoride, polyacrylonitrile and polyvinyl chloride, polysulfon, polyether sulfon, aliphatic polyamide, cellulose esters, etc. can be used singly or in combination as a raw material. The microfiltration membrane is produced as follows. A polymer solution is prepared by dissolving the aforementioned polymer in (1) a good solvent, (2) a mixture of a good solvent and a non-solvent or (3) a swelling solvent for the polymer. The film-forming polymer solution is cast on a support or poured directly into a coagulation both, washed and dried to thereby produce a microfiltration membrane. In this case, examples of the solvent for dissolving the polymer include dichloromethane, acetone, dimethyl formamide, dimethyl acetamide, dimethyl sulfoxide, 2-pyrrolidone, N-methyl-2-pyrrolidone, sulfolane, etc.

Examples of the non-solvent to be added to the solvent include: water; cellosolves; alcohols such as methanol, ethanol and isopropanol; ketones such as acetone and methyl ethyl ketone; ethers such as tetrahydrofuran and dioxane; polyols such as glycerin and ethylene glycol; etc. Although the proportion of the non-solvent to the good solvent may be selected to be in any suitable range as long as the mixture can be kept homogenous solution, it is preferably selected to be in a range of from 5 to 50% by weight.

Further, inorganic electrolytes, organic electrolytes, high molecular-weight polymers, etc. called "swelling agents" may be added as agents for controlling the porous structure.

Examples of the swelling agents to be used in the present invention include: hydrophilic high polymers such as polyethylene glycol and polyvinyl pyrrolidone; metal salts of inorganic acids such as sodium chloride, sodium nitrate, potassium nitrate, sodium sulfate, zinc chloride, magnesium bromide, etc.; salts of organic acids such as sodium acetate, sodium formate, potassium butyrate, etc.; polyelectrolytes such as sodium polystyrenesulfonate, polyvinylpyrrolidone, polyvinylbenzyltrimethylammonium chloride, etc.; ionic surface active agents such as sodium dioctylsulfosuccinate, sodium alkylmethyltaurate, etc.; and so on. Although some of these electrolytes may exhibit an effect to a certain extent when they are added singly to the polymer solution, these electrolytes may exhibit a particularly remarkable effect when these electrolytes are added as an aqueous solution. Although the amount of the electrolytic aqueous solution to be added is not limited specially so long as the homogeneity of the solution is kept, the amount of the electrolytic aqueous solution is generally selected to be in a range of from 0.5% by volume to 10% by volume ratio to the solvent. Further, the concentration of the electrolytic aqueous solution, is not limited specially. Although the effect increases as the above concentration increases, the concentration used generally is in a range of from 1% by weight to 60% by weight. The polymer concentration in the film-forming solution is selected to be in a range of from 5 to 35% by weight, preferably from 10 to 30% by weight. If the polymer concentration exceeds 35% by weight, the water permeation of the resulting porous membrane is lowered to an extent so that the porous membrane is inavailable for practical use. If the polymer concentration is lower than 5% by weight, a microfiltration membrane with a sufficient performance for separation cannot be obtained.

The polymer solution prepared as described above is cast on a support and the casting film is immersed, together with the support, in a coagulation bath immediately or after a given period of time. Although water is most generally used as the coagulative liquid, any one of polymer-insoluble organic solvents may be used or a mixture of two kinds or more of these non-solvents may be used.

Although any one of materials which are usable as the support may be used generally as the support for producing the microfiltration membrane, nonwoven fabric is particularly preferable because it is unnecessary to peel the support when nonwoven fabric is used. The nonwoven fabric used in the present invention may be formed from a general material such as polypropylene, polyester, etc. and the material for the nonwoven fabric is not limited.

The cast film on which formed by precipitation in a coagulation bath is then washed with cold water, or hot water, washed with a solvent and dried.

The microfiltration membrane 13 produced as described above is generally pleat-processed by a known method. The liquid-permeable sheets 12 and 14 are formed from nonwoven fabric, paper, and/or net, or the like (see FIG. 2). The pleat membrane is cut at uneven portions in its opposite end portions by a cutter knife, or the like, in order to true up the opposite end portions and is rounded in the form of a cylinder so that the pleated portions of joints thereof are sealed liquid-tightly by using a heat seal or with an adhesive agent.

Although there are several methods to be used in the end sealing step in accordance with kinds of the material for the end plates, the end sealing step is, in any case, carried out by a conventionally known technique. When thermosetting epoxy resin is used for the end plates, the liquid of an epoxy resin adhesive agent prepared is poured into a potting mold and preliminarily hardened so that one end surface of the cylindrical filtration material is inserted in the epoxy adhesive agent after the viscosity of the adhesive agent becomes moderately high. Then, the adhesive agent is heated so as to be hardened thoroughly. When the material for the end plates in a thermoplastic resin such as polypropylene or polyester, a method is used in which one end surface of the cylindrical filtration material is inserted in the resin just after the thermally melted resin is pored into a mold. On the other hand, such a method is also used in which: only the surface of the end plate is melted by bringing only the seal surface of the end plate having already molded into contact with a heated plate or by being heated by means of an infrared heater; and one end surface of the cylindrical filtration material is pressed against the molten surface of the plate so as to be fused to the plate.

With respect to the step of filling up a high molecular polymer in pores at end portions of the film, which is a feature of the present invention, there are a method in which the step is carried out just before pleating and a method in which the step is carried out after the joints formed by rounding the filtration material in the form of a cylinder are heat-sealed after pleating. In the latter, after an end portion of the cylindrical film is immersed in a treating solution having viscosity adjusted to a moderate value, excess liquid is wiped off and the cylindrical film is dried by heating. Then, an opposite end of the cylinder is treated in the same manner as described above. Then, the cylindrical film is washed with hot water so that unreacted cross-linking agents and other components dissolved in hot water are removed. On the other hand, in the case where the step is to be carried out before pleating, a treating solution is applied only to opposite end portions of the film simultaneously by a known method such as gravure coating, bar coating, or the like, is made to pass through a high-temperature zone and a hot water washing zone successively and is finally dried and wound up. When pores in the vicinity of joints formed by rounding the cylindrical pleated film are also filled with a high molecular-weight polymer, a higher effect may be obtained.

A hydrophilic material is preferably used as the high molecular-weight polymers. Examples of the hydrophilic material include: vinyl polymers such as polyvinyl alcohol, vinyl alcohol-ethylene copolymer, polyvinyl pyrrolidone, polyhydroxyethyl acrylate, polyhydroxyethyl methacrylate, polyamide acrylate, etc.; cellulose derivatives such as hydroxyethyl cellulose, hydroxypropyl cellulose, etc.; polymer saccharides such as chitin, chitosan, alginic acid, etc.; gelatin; and so on. The hydrophilic material is not limited to the specific examples described above. When a water-soluble hydrophilic high polymer is used, it is necessary that high molecular-weight polymers are chemically cross-linked to convent into water-insoluble product to thereby prevent the filled high polymer from being dissolved out in the filtrate at practical filtration process. Although the cross-linking agent can be known easily correspondingly to the kind of the hydrophilic high molecule by those skilled in the art, there is, in most cases, used a chemical compound having two or more isocyanate groups, glycidyl groups, aldehyde groups, or the like. Alternatively, melamine or a chelating metal compound may be used. Addition of acid catalyst may be effective. Specific examples of polyvinyl alcohol and gelatin particularly effective among the hydrophilic high molecules are shown in Examples 1 and 2 respectively.

There may be also a method using material other than the materials being in a high molecular state initially, that is, a method using hydrophilic vinyl monomers such as vinyl alcohol, hydroxyethyl acrylate, hydroxyethyl methacrylate, vinyl pyrrolidone, acrylamide, diethyleneglycol diacrylate, polyethyleneglycol diacrylate, acrylic acid, vinyl sulfonic acid, or p-styrene sulfonic acid. A solution obtained by adding a polyfunctional vinyl monomer and a polymerization initiating agent to a single monomer of these monomers or a mixture thereof is applied to opposite end portions of the film or the film is immersed in the solution so that the solution is soaked in the membrane pores. Polymerization and drying are conducted simultaneously by applying heat in a range of from 60 to 180° C., so that a hydrophilic high molecule can be formed in the film pores. The combination and proportion of the hydrophilic monofunctional monomer, the polyfunctional monomer and the polymerization initiating agent will be found easily in a simple experiment by those skilled in the art. Examples of hydroxymethacrylate and polyethyleneglycol diacrylate which are particularly preferred materials are shown in Examples 3 and 4 respectively. After polymerization, the film is washed with hot water to remove unreacted monomer.

The amount of the high polymer required to fill up the membrane pores to thereby reject the liquid permeation is at least 1 mg/cm$^2$ per membrane unit area. Preferably, when the amount is not smaller than 2 mg/cm$^2$, the object can be achieved nearly certainly. Care must be required in the point that if the membrane pores are filled with an excessive amount of the high molecule more than required, there may arise disadvantages that the film becomes hard and fragile and that the sealing between the film and the end plate becomes poor. If only the pores in the inside of the membrane are selectively filled with the high molecular-weight polymer without filling the pores in opposite surfaces of the film with the high polymer, liquid-tight sealing can be obtained over almost all the end plate materials. When not only the pores in the inside of the film but also the pores in the surface of the film are to be filled with high polymer, it is necessary to select a material which is capable of adhering well to the high polymer, as the material for the end plates.

It is sufficient that the width of filled high polymer is at least 2 mm from a corresponding end of the membrane. If the filling width is taken to be unnecessarily large, the effective area for filtration is reduced inconveniently.

EXAMPLES

The present invention will be described below more in detail on the basis of the following reference example and examples but the invention is not limited to these examples.

REFERENCE EXAMPLE

There is shown an example in which a microfiltration membrane is formed by using polysulfon as a raw material. 15 part of polysulfon (P-3500, made by Amoco Chemicals), 70 part of N-methyl-2-pyrrolidone, 15 part of polyvinyl pyrrolidone, 2 part of lithium chloride and 1.3 part of water were dissolved homogeneously to prepare a membrane-forming polymer solution. The polymer solution was cast to a product thickness of 180 μm. Just after air was supplied for 8 seconds to the surface of the casting liquid film at 25° C., under a relative humidity of 50%, and an air speed of 1.0 m/sec, the film was immersed in a coagulation bath filled with water at 25° C. to form a microporous structure. The bubble point of the membrane was 150 kPa in water.

EXAMPLE 1

10 part of polyvinyl alcohol (PVA220 made by Kuraray Co., Ltd.) and 1 part of 2N sulfuric acid were dissolved homogeneously in 89 part of water to prepare a coating.

The aforementioned coating composition was applied by about 140 ml/m$^2$ to 5 mm widths of opposite ends of the polysulfon microfiltration membrane used in Reference Example. The coating solution was heated at 100° C. for 10 minutes, washed with hot water at 80° C. for 5 minutes and then dried. When 3 m of the film was assembled into a pleated cartridge and the wettability of the membrane was measured, the amount of permeated air was less than 8 ml/min, that is, the film had a good wettability.

The wettability of the cartridge filter was measured by measuring the amount of permeated air while cool water passes though the dried cartridge filter at 4 l/min flow rate under applied pressure of 100 kPa for 10 minutes to make the filter to be wet.

EXAMPLE 2

A homogenous solution of 20 part of gelatin, 10 part of ethylene diglycidyl ether (Denachol EX-810, made by Nagase Kasei Kogyo Co., Ltd.) and 70 part of water was prepared as a coating solution.

3 m of the film used in Reference Example was interposed between two sheets of polypropylene non-woven fabric and pleated. The pleated membrane was rounded in the form of a cylinder and joints of the film were heat-sealed. Opposite end of the thus formed cylinder were alternately immersed in the coating solution with a depth of 3 mm and then heated at 90° C. for 40 minutes. After washed with hot water at 80° C. for 30 minutes, the cylinder was dried and the opposite ends of the cylinder were fused to polypropylene end plates respectively to complete a cartridge filter. The amount of permeated air was less than 8 ml/min, that is, the wettability of the cartridge filter was good.

EXAMPLE 3

A homogenous solution of 25 part of hydroxyethyl methacrylate, 10 part of polyethyleneglycol diacrylate (NK ESTER A600, made by Shin-Nakamura Chemical Corp.), 1 part of a polymerization initiating agent V-50, 24 part of ethylene glycol and 24 part of water was prepared as a coating composition. 3 m of the membrane used in Reference Example was interposed between two sheets of polypropylene nonwoven fabric and pleated. The pleated membrane was rounded in the form of a cylinder and joints of the membrane were heat-sealed. Opposite ends of the thus formed cylinder were alternately immersed in the coating solution with a depth of 3 mm and then heated at 90° C. for 30 minutes. After washed with hot water at 80° C. for 30 minutes, the cylinder was dried and the opposite ends of the cylinder were fused to polypropylene end plates respectively to complete a cartridge filter. The amount of permeated air was less than 8 ml/min, that is, the wettability of the cartridge filter was good.

EXAMPLE 4

A homogenous solution of 35 part of polyethyleneglycol diacrylate (NK ESTER A600, made by Shin-Nakamura Chemical Corp.), 1 part of a polymerization initiating agent V-50, 24 part of ethylene glycol and 24 part of water was prepared as a coating solution. 3 m of the membrane used in Reference Example was interposed between two sheets of polypropylene nonwoven fabric and pleated. The pleated membrane was rounded in the form of a cylinder and joints of the membrane are heat-sealed. Opposite ends of the thus formed cylinder were alternately immersed in the coating solution with a depth of 3 mm and then heated at 90° C. for 30 minutes. After washed with hot water at 80° C. for 30 minutes, the cylinder was dried and the opposite ends of the cylinder were fused to polypropylene end plates respectively to complete a cartridge filter. The amount of permeated air was less than 8 ml/min, that is, the wettability of the cartridge filter was good.

According to the present invention, the microfiltration membrane cartridge filter can be made wet to water very easily. As a result, the integrity test of the filter can be carried on easily and accurately. Accordingly, more highly reliable filtration can be done.

What is claimed is:

1. A microfiltration membrane cartridge filter comprising:
   a pleated membrane sheet having a plurality of pores and rounded in a cylindrical shape, the pores having a mean pore size in a range of from 0.5 to 10 μm; and
   a pair of end plates liquid-tightly sealing rounded joints of the pleated filtration membrane and liquid-tightly sealing opposite ends of the cylindrical shape of the pleated filtration membrane sheet,
   wherein the pores in the opposite ends are filled with a high molecular-weight polymer to reject a liquid-permeation of the opposite ends, and
   wherein only pores inside the pleated membrane sheet are filled up with the high molecular-weight polymer while free pores remain in front and rear surfaces of the pleated membrane sheet.

2. A microfiltration membrane cartridge filter according to claim 1, wherein said pleated membrane sheet comprises a porous membrane with an aerotropic structure having a minimum pore size layer in its inside in a direction of the thickness of the film.

3. A microfiltration membrane cartridge filter according to claim 1, wherein said high molecular-weight polymer filled in the pores is a hydrophilic material.

4. A microfiltration membrane cartridge filter according to claim 3, wherein said hydrophilic material is selected from the group consisting of polyvinyl alcohol, vinyl alcohol-ethylene copolymer, polyvinyl pyrrolidone, polyhydroxyethyl acrylate, polyhydroxyethyl methacrylate, polyamide acrylate, hydroxyethyl cellulose, hydroxypropyl cellulose, chitin, chitosan, alginic acid, and gelatin.

5. A microfiltration membrane cartridge filter according to claim 4, wherein said hydrophilic material is polyvinyl alcohol or gelatin.

6. A microfiltration membrane cartridge filter according to claim 1, wherein said high molecular-weight polymer is chemically cross-linked by cross-linking agent.

7. A microfiltration membrane cartridge filter according to claim 6, wherein said cross-linking agent is a chemical compound having two or more isocyanate groups, glycidyl groups, and/or aldehyde groups.

8. A microfiltration membrane cartridge filter according to claim 1, wherein the amount of said high molecular-weight polymer required to fill up said pores is at least 1 mg/cm$^2$ per membrane unit area.

* * * * *